United States Patent
Mohr (10) Patent No.: US 9,324,157 B2
(45) Date of Patent: Apr. 26, 2016

(54) MEDICAL IMAGE DATA PROCESSING APPARATUS AND METHOD

(71) Applicants: KABUSHIKI KAISHA TOSHIBA, Tokyo (JP); Toshiba Medical Systems Corporation, Otawara-shi (JP)

(72) Inventor: Brian Mohr, Edinburgh (GB)

(73) Assignees: KABUSHIKI KAISHA TOSHIBA, Tokyo (JP); TOSHIBA MEDICAL SYSTEMS CORPORATION, Otawara-shi (JP)

( * ) Notice: Subject to any disclaimer, the term of this patent is extended or adjusted under 35 U.S.C. 154(b) by 38 days.

(21) Appl. No.: 13/850,808

(22) Filed: Mar. 26, 2013

(65) Prior Publication Data

US 2014/0294269 A1    Oct. 2, 2014

(51) Int. Cl.
*G06K 9/00* (2006.01)
*G06T 7/00* (2006.01)

(52) U.S. Cl.
CPC ..... *G06T 7/0091* (2013.01); *G06T 2207/10072* (2013.01); *G06T 2207/20101* (2013.01); *G06T 2207/30008* (2013.01); *G06T 2207/30101* (2013.01)

(58) Field of Classification Search
None
See application file for complete search history.

(56) References Cited

U.S. PATENT DOCUMENTS 6,842,638 B1 *  1/2005  Suri et al. ............... 600/425
8,676,300 B2 *  3/2014  Strommer et al. ...... 600/431
2005/0113679 A1  5/2005  Suryanarayanan et al.
2006/0269109 A1  11/2006  Okada et al.
2012/0134564 A1 *  5/2012  Zheng et al. ............ 382/131
2012/0271157 A1 *  10/2012  Wong .................... A61B 5/055
                                                                   600/419

FOREIGN PATENT DOCUMENTS

JP       2006-102353 A     4/2006

OTHER PUBLICATIONS

Björn Nilsson et al., "A fast algorithm for level set-like active contours", Pattern Recognition Letters, vol. 24, 2003, pp. 1331-1337.

\* cited by examiner

*Primary Examiner* — Utpal Shah
*Assistant Examiner* — Mai Tran
(74) *Attorney, Agent, or Firm* — Oblon, McClelland, Maier & Neustadt, L.L.P.

(57) ABSTRACT

An image data processing apparatus comprising a image data processing unit for obtaining segmented image data segmented using a segmentation process and including a representation of a vessel, wherein a region of the vessel is missing from the representation, a boundary identification unit for identifying at least one point at or near a boundary of the missing region, wherein the image data processing unit is configured to perform a further segmentation process to identify the missing region of the vessel, using the location of the at least one identified point at or near the boundary of the missing region, and the image data processing unit is further configured to generate a revised representation of the vessel including the missing region of the vessel.

20 Claims, 6 Drawing Sheets
(4 of 6 Drawing Sheet(s) Filed in Color)

Low density bone means spine is
not included with aorta in top-hat filter

Figure 6

MEDICAL IMAGE DATA PROCESSING APPARATUS AND METHOD

FIELD

Embodiments described herein relate generally to a method of, and and apparatus for, image data processing and, in particular though not exclusively, for determining regions of vessel structures that have been occluded, for example by a bone mask.

BACKGROUND

The display of rendered images, for example 3D or 2D images, by processing and rendering volumetric image data obtained using any of a variety of different imaging modalities is increasingly common. Such imaging modalities include, but are not limited to ultrasound imaging, MRI, CT, PET and the like.

It is often desired to view only certain features of interest, for example vessels, bone, flesh, or selected anatomical features. There are numerous known automatic segmentation algorithms that can be used to extract and render only image data relating to such features of interest, for instance to extract and render only bone, or vessels. Such vessels can include, for example, vessels forming part of the vasculature system, the lymph system, the nervous system, or airways.

Some such known automatic segmentation algorithms generate masks that can be used to mask out data that does not relate to the current region of interest, for example to mask out data representing regions of bone, or regions where a gantry table or other equipment, or other artefact, is present.

It can be difficult for known automatic segmentation algorithms to distinguish accurately between substances of different types in some circumstances.

For example, when viewing CT angiography data in SVR, vessels are commonly obstructed by bone. Automatic bone segmentation algorithms are commonly used to identify the bone and remove it from visualization. However, it is difficult to distinguish vessel, when injected with a contrast agent, and bone in CTA data (they have very similar intensity), and automatic bone segmentation occasionally incorrectly identifies some vessel as bone. Such incorrect identification of vessels as bone can lead to occlusion of vessels, such that when the identified bone data is subtracted and the remaining vessel data is rendered, some parts of the vessel can seem to be missing.

There is significant anatomical variation in bone and vessel size throughout the body, and misidentification of bone as vessel, or vice versa, can commonly occur when a contrasted vessel or vessels are in close proximity to bone. The most common anatomical regions where this occurs is the branch of the iliac artery passing just under the pelvis, the aorta near the spine, and femoral and other arteries in the legs near the femur and other long bones. Errors commonly misidentify small (approximately 1 to 2 cm) sections of vessel as bone, particularly where there is little intensity variation between vessel and bone. These sections appear to the user as gaps in the contrasted vessels in the SVR view.

It is known to enable a user to manually adjust regions, for example to manually identify regions as being vessel rather than bone. However, that can be time-consuming and inefficient for the user, for example a radiographer or radiologist.

There have been attempts to increase the sophistication of automatic segmentation algorithms to reduce misidentification of vessel and bone.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments are now described, by way of non-limiting example only, and are illustrated in the following figures, in which.

DETAILED DESCRIPTION

Certain embodiments provide an image data processing apparatus comprising an image data processing unit for obtaining segmented image data segmented using a segmentation process and including a representation of a vessel, wherein a region of the vessel is missing from the representation. The apparatus also includes a boundary identification unit for identifying at least one point at or near a boundary of the missing region. The image data processing unit is configured to perform a further segmentation process to identify the missing region of the vessel, and the image data processing unit is further configured to generate a revised representation of the vessel including the missing region of the vessel.

Certain embodiments also provide an image data processing method comprising obtaining segmented image data that is segmented using a segmentation process and that includes a representation of a vessel, wherein a region of the vessel is missing from the representation, identifying at least one point at or near the boundary of the missing region, performing a further segmentation process to identify the missing region of the vessel using the location of the at least one selected point, and generating a revised representation of the vessel including the missing region of the vessel.

Figure 1:
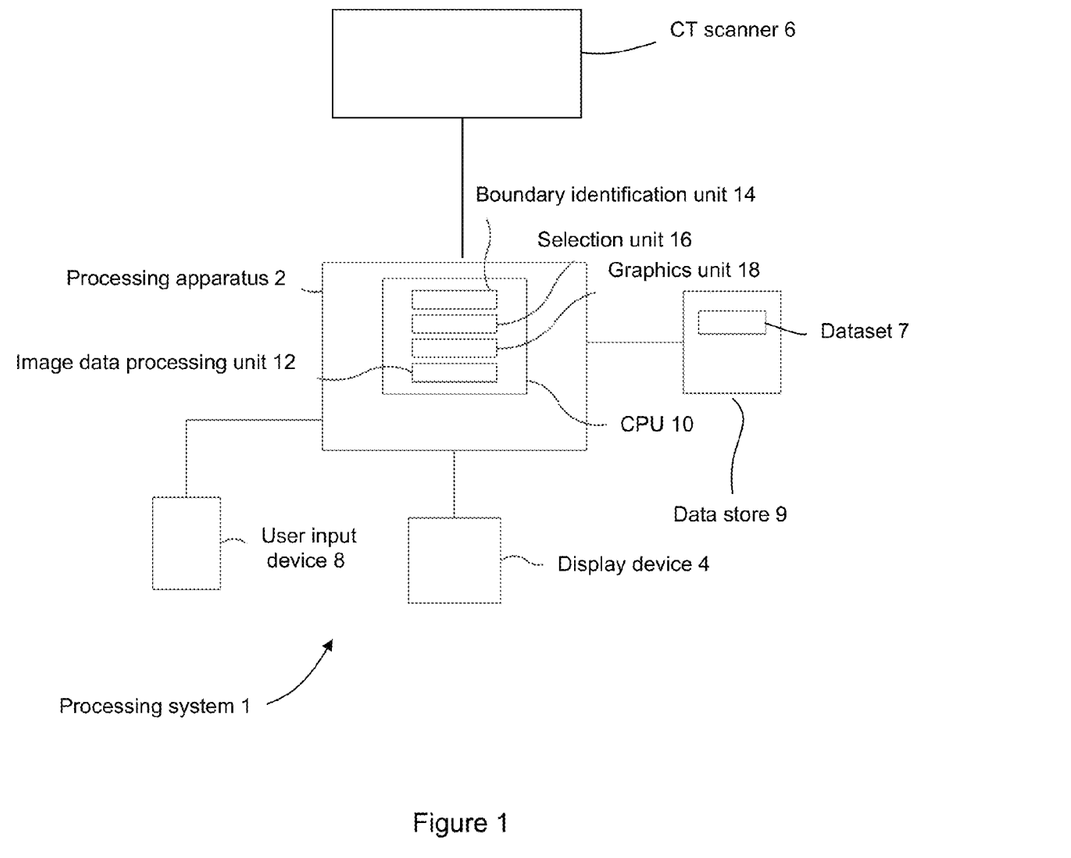
FIG. 1 is a schematic diagram of an image processing system according to an embodiment.

A medical image processing system 1 according to an embodiment is illustrated schematically in FIG. 1 and comprises a processing apparatus 2 configured to implement a method as described above. In the embodiment shown in FIG. 1, the processing apparatus 2 may comprise a personal computer (PC) or workstation. The processing system 1 further comprises a display device 4, a CT scanner 6 and a user input device or devices 8, in this case a computer keyboard and mouse. The system 1 also includes a data store 9.

Any suitable type of CT scanner may be used that is able to perform 3D CT measurements on a patient or other subject, for example one of the Aquilion™ series of scanners produced by Toshiba Medical Systems Corporation. Although the embodiment of FIG. 1 is described in relation to CT scan data, any other suitable type of scanner producing any suitable type of image data may be used in alternative embodiments, for example MRI or PET data of suitable form.

The processing apparatus 2 provides a processing resource for automatically or semi-automatically processing image data, and comprises a central processing unit (CPU) 10 that is able to load and operate a variety of software units or other software components that are configured to perform a method as described in detail below with reference to FIG. 2.

The software units include an image data processing unit 12 for receiving image data and performing a variety of processing techniques, including segmentation, filtering and masking if necessary. The software units also include a boundary identification unit 14 for identifying one or more points at or near a boundary of a missing region of a vessel, and a selection unit 16 for determining selected points selected by a user or automatically. The software units also include a graphics unit 18 for generating a signal for the display of images on the display device 4.

The processing apparatus 2 includes a hard drive and other components of a PC including RAM, ROM, a data bus, an operating system including various device drivers, and hardware devices including a graphics card. Such components are not shown in FIG. 1 for clarity. Any other suitable processing apparatus may be used in alternative embodiments.

In the embodiment of FIG. 1 a volumetric image data set 7 is received by the processing apparatus 2 from the CT scanner 6 following acquisition of a scan by the scanner 6, and is stored in the data store 9 and processed by the processing apparatus 2.

In a variant of the embodiment of FIG. 1, the processing apparatus 2 receives a volumetric or other image data set from a remote data store (not shown). The remote data store stores a large number of different data sets obtained from many different scanners over an extended period of time together with associated patient data, for example a data store forming part of a Picture Archiving and Communication System (PACS).

Figure 2:
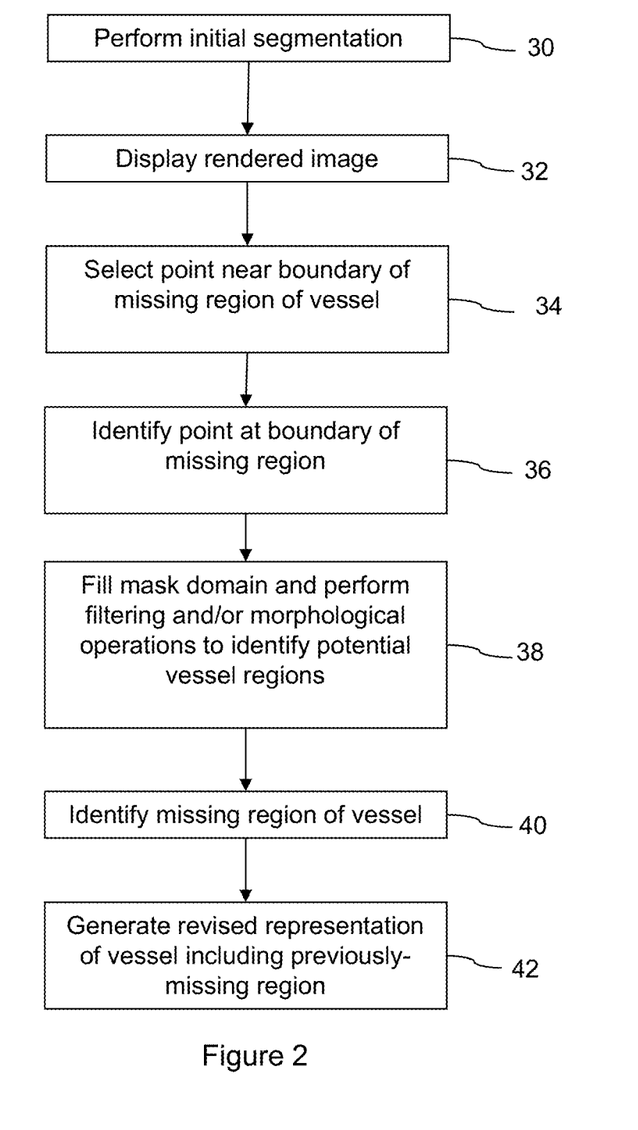
FIG. 2 is a flow chart illustrating in overview a mode of operation of the image processing system of FIG. 1.

The system of FIG. 1 is configured to perform a method of medical image processing having a sequence of stages as illustrated in overview in the flow chart of FIG. 2.

At the first stage 30 volumetric image data, in this case CT image data, obtained from measurements on a patient by the CT scanner 6 is received by the processing apparatus 2. The image data processing unit 12 performs known image data processing on the received data, which in this case includes performance of a segmentation process that automatically segments bone material and blood vessel.

In this case a segmentation algorithm such as included in the Voxar 3D product is used, but any other suitable segmentation algorithm or procedure may be used.

The image data processing unit 12 also performs a rendering process, to render a representation of the volumetric data in accordance with a user-selected view. Any suitable rendering process can be used to produce 2D or 3D images, for example MIP, MPR or surface volume rendering (SVR).

At the next stage 32, the rendered data is passed to the graphics unit 18 for output of an image of the selected view on the display device 4.

Figure 3A:
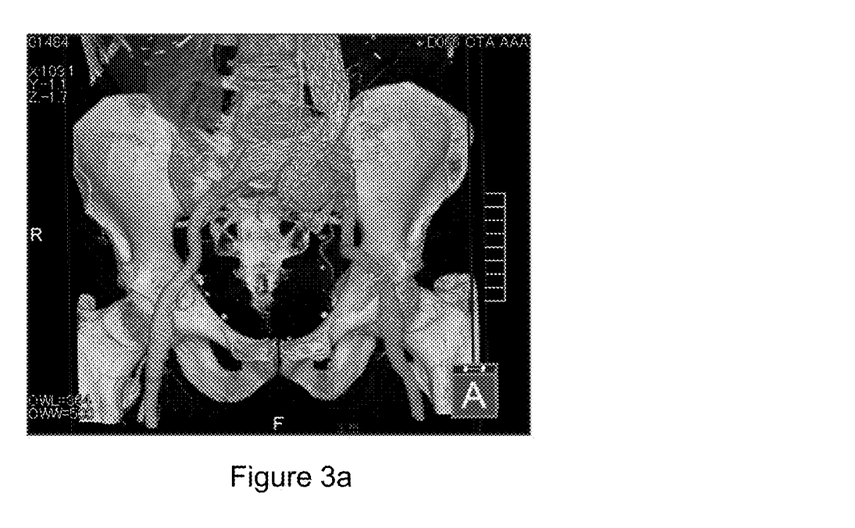
FIG. 3a is a surface volume rendered image of a region of a patient.
Figure 3B:
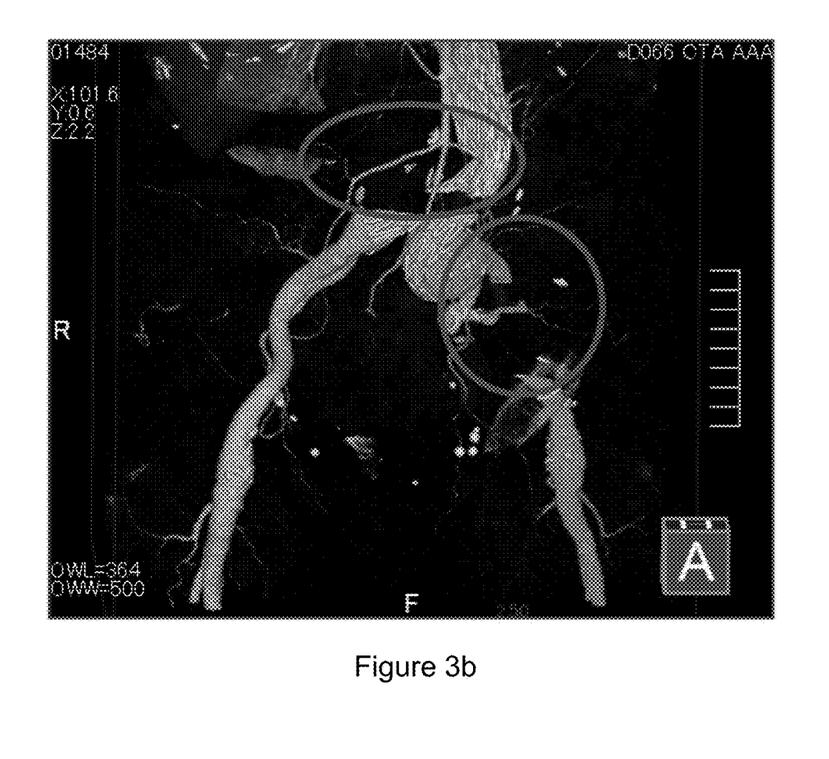
FIG. 3b is a surface volume rendered image of part of the region shown in FIG. 3a, segmented to show blood vessels, with missing blood vessel regions indicated.

In the present example, the image data processing unit 12 performs a surface volume rendering process to produce the SVR image shown in FIG. 3b, which shows regions of blood vessel. FIG. 3a is a volume rendered image of the same patient, obtained from the same set of image data, which shows both bone and blood vessel. In the image of FIG. 3b the regions identified as being bone have been masked out leaving only blood vessel. However, the bone segmentation has misidentified some regions of blood vessel as being bone, and so when the data of the bone mask region is subtracted, certain regions of blood vessel are missing. Those regions of blood vessel that are obstructed by the mask, and thus removed when the mask data is subtracted from the rendered image dataset, may be referred to as being occluded.

In alternative embodiments, the volumetric image data is received from a remote data store rather than from measurement apparatus such as the CT scanner 6. The received data may be already segmented and/or already rendered, in which case rendering or segmentation processes may not necessarily be performed by the image data processing unit 12.

The user is able to observe that at least some parts of the vessel structure have been occluded, as shown in FIG. 3b. The user is then able, at stage 34, to select in the rendered view a point 44 associated with the vessel, if the user considers that regions of the vessel may have been occluded or are otherwise missing. In this case the user selects a point by positioning a mouse pointer at the point and then clicking on a mouse button, but any other suitable method for selecting the point may be used. The selection unit 16 processes the user input and determines the position of the selected point.

In alternative embodiments, the point 44 is selected automatically by a processing unit installed at the processing apparatus 2 using any suitable automatic selection algorithm. For example, an intensity threshold may be applied to determine a domain of all the bright tissue (vessel and bone). Subtracting the segmented bone (and occluded vessel) domain from the thresholded domain should, in principle, leave only the vessel domain. It may be assumed that the vessel domain should, ideally and in the absence of occlusion, be a single connected domain. Connected component analysis can be used to identify the number of domains. If there is an occlusion, there should be multiple domains. For any pair of non-connected domains, seed points may be identified automatically by determining the point in each domain that is the shortest distance from the other domain. In some such alternative embodiments, the seed point or points 44 may be selected automatically before display of the blood vessels to the user, as in such automated embodiments the user does not need to view the blood vessels in order to identify occluded regions or seed points.

Figure 4A:
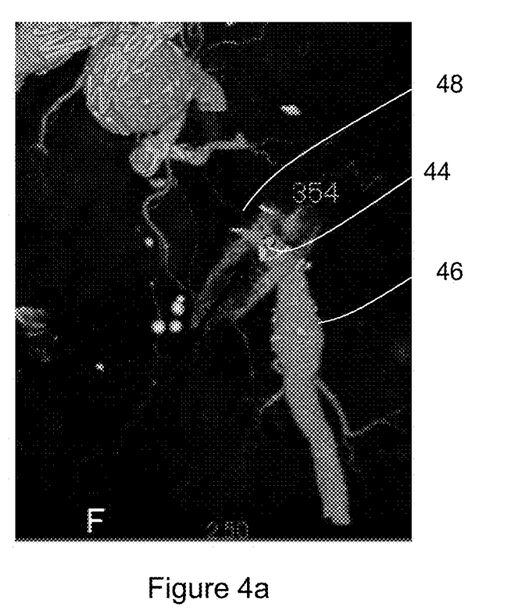
FIG. 4a is a magnified view of part of the region shown in FIG. 3b.

A magnified version of the image of FIG. 3b is shown in FIG. 4a, and includes point 44 selected by a user at stage 34. Point 44 is near the boundary between the vessel 46 and an occluded region 48 of the vessel. It will be clear to the user, for example a medical professional having knowledge of anatomy, that in this case a region of the vessel 46 is occluded and it is straightforward in this case for the user to select a point near the occluded region. The user is not limited to select a single point and in alternative embodiments may select a region of the vessel, comprising a plurality of points, or may separately select a plurality of individual points.

At the next stage 36, the boundary identification unit 14 determines at least one point at or near the boundary of the occluded region 48 of the vessel using the selected at least one point 44 as a starting point. The determination of the at least one point at or near the boundary of the occluded region can be performed using any suitable segmentation or other process, but in this case a level set process is used to follow the vessel from the selected point 44 to the boundary of the occluded region 48. The process is not subject to strong constraints and is used to identify a seed point at or near the boundary between the occluded and non-occluded regions of the vessel, also referred to as a point of occlusion, and to estimate the radius of the vessel.

In this case, a level-set is initialized with a sphere of radius 2.0 mm and is limited to a cube with 3.0 cm per side centred at the point 44, also referred to as the user-input seed point 44. It is also constrained to only segment outside of the automatically segmented bone domain. It is assumed the level-set will reach the point of occlusion by the bone domain.

In this embodiment, to identify a seed point at the point of occlusion the segmented vessel domain is dilated by one voxel. The seed point at the point of occlusion is identified by the intersection of the dilated vessel domain and the bone domain. In the embodiment of FIG. 2, not only is a seed point determined, but an intersection domain representing the intersection of the vessel with the initially determined bone domain may be determined and used in later stages.

The radius of the vessel is then estimated by first determining the principal direction of the segmented vessel domain 46 and then slicing the domain 46 with a plane perpendicular to this direction. The radius is computed from the area of the largest connected component assuming it is circular (vessels generally have elliptical shape—it is understood this is only an approximation).

In alternative embodiments, further properties of the vessel 46 are determined as well as or instead of the radius, for example another measure of size of the vessel, an orientation of the vessel, or a spatial configuration of the vessel. The image data processing unit 12 is configured to use the determined at least one property as a constraint in performance of a subsequent, further segmentation process.

At the next stage 38, the bone domain is filled and filtering and/or morphological operations are performed to identify potential vessel regions. It is a feature of this embodiment that the operations used to identify potential vessel regions are selected from a plurality of possible operations in dependence on an estimated size, or other property of the vessel (for example, whether the vessel is considered to be a large vessel or a medium to small vessel).

The filling of the automatically segmented bone domain is performed using a technique that preserves the edges while filling in the less dense centres of bones and the pelvic region.

The filling of the bone domain is performed because the low density interior of bone is generally not included in the initial automatically segmented bone domain, also referred to as the bone mask. The morphological identification that is performed subsequently relies, in the present embodiment, on the full bone domain.

Figure 5A:
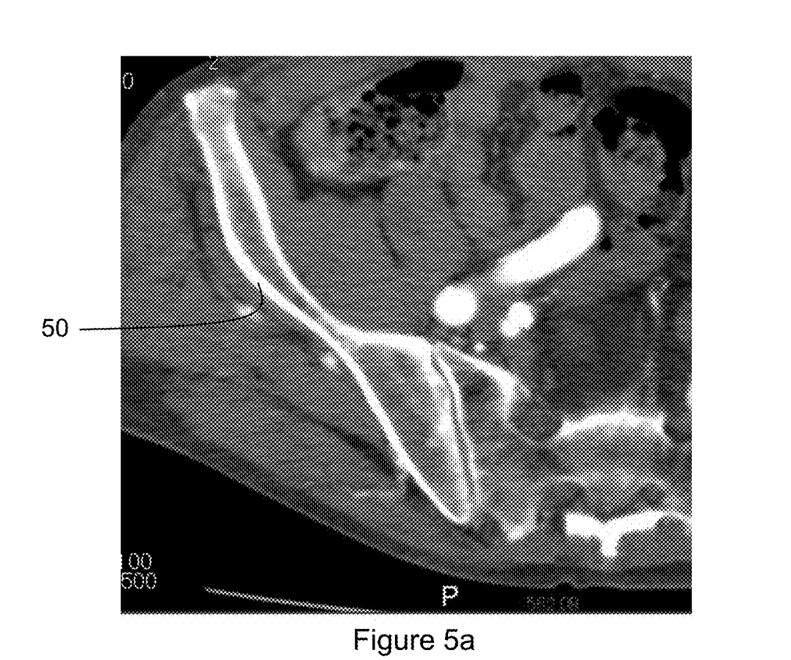
FIG. 5a is an image including a bone region.
Figure 5B:
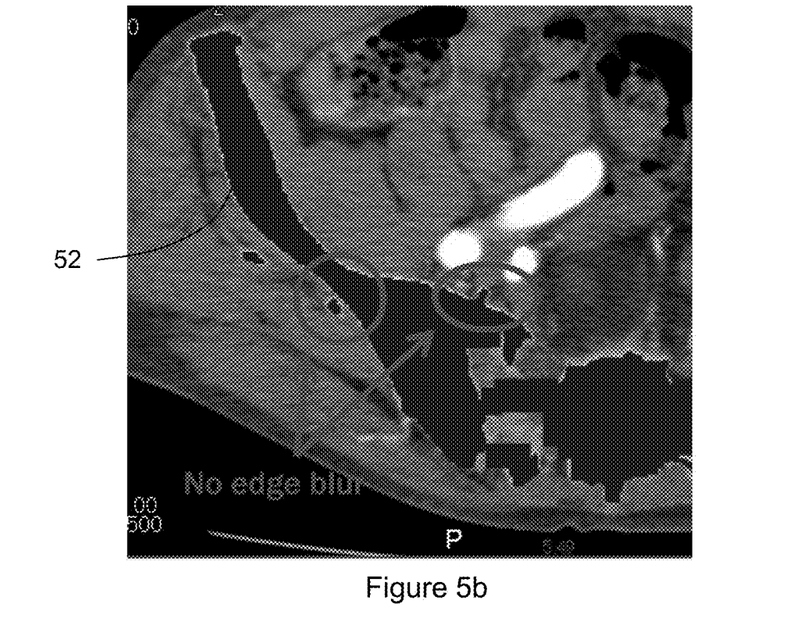
FIG. 5b is an image that corresponds to that of FIG. 5a, with the bone region filled.

Simply filling the bone domain in 3D may cause errors in some cases, as high intensity regions (for example, pelvis and spine) may not be connected. Furthermore, morphological operations such as close may blur edges and may inhibit distinction between bone and vessel. Therefore, in the described embodiment, the filling of the bone domain is performed by successively filling the 3D bone domain in 2D slices in each of the principal directions. An example of a bone domain 50 before filling is shown in FIG. 5a, and the bone domain after filling is shown in FIG. 5b.

Once the bone domain has been filled, the image data processing unit 12 performs filtering and/or morphological operations to identify potential vessel regions and potential bone regions in regions around the algorithm-identified seed point. Such operations may be subject to morphological constraints.

It is a feature of the embodiment that the morphological constraints differ according to the estimated vessel radius, or other vessel property, determined at stage 36.

In this case, it is determined whether the estimated vessel radius is greater than a threshold value. In the present embodiment, the threshold value is 6.0 mm but other threshold values may be used in other embodiments or applications.

If the vessel radius is estimated to be greater than 6.0 mm, the vessel is considered to be a "large" vessel, such as the aorta. The assumption is that the vessel has a larger minimum luminous cross-section than any surrounding bone. A 3D top hat filter, or other size-dependent filter, with a suitable radius is applied to remove luminous objects with a radius of 6.0 mm or greater. The volume after the application of the filter should thus contain only bone. In this case, in which the vessel radius is greater than the 6.0 mm threshold, the filter is applied to the data including the original bone domain, rather than the filled domain.

Figure 6:
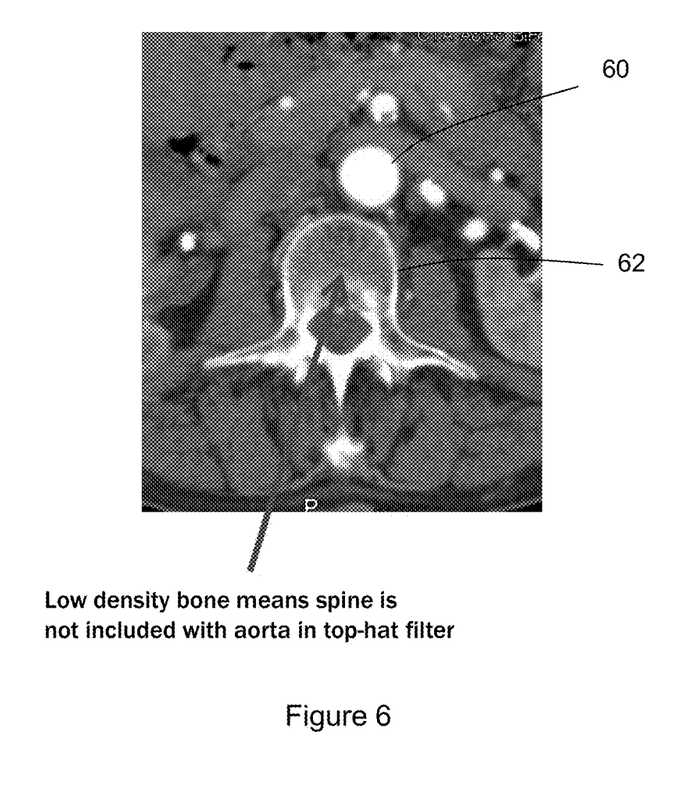
FIG. 6 is an image of part of a spine, showing low density regions within the spine.

By way of example, FIG. 6 shows an image that includes an aorta 60 close to a portion of spine 62. The spine includes low density material in its interior, and application of the top hat filter is thus able to distinguish the aorta, which provides a high intensity signal over its whole area, from the spine, which provides a high intensity signal only around its perimeter.

An intensity threshold is applied to the filtered volume to identify the bone. Connected component analysis is then used to identify and remove small components above threshold. Vessel regions within the original automatically segmented bone domain are then identified by subtracting this modified bone domain from the original automatically segmented bone domain.

The algorithm also checks the consistency of its assumptions. It ensures the identified vessel domain intersects with the identified point of occlusion. If that requirements is not met, the algorithm continues to the "medium to small" vessel case, which is now described in more detail.

The "medium to small" vessel case is used if the algorithm concludes that its assumptions are inconsistent as mentioned in the preceding paragraph or if, in the initial comparison of the estimated vessel radius to the threshold value, it is concluded that the vessel radius is less than the threshold value (in this case 6.0 mm).

In the "medium to small" vessel case, a constant high intensity is applied to the volume within the filled bone domain, so that all points within the filled bone domain are given the same, constant intensity.

A 3D top-hat filter, or other size-dependent filter, is then applied with a radius of 6.0 mm, which should remove all of the bone from the volume. Vessel regions are then identified by applying an intensity threshold to the data remaining after application of the filter.

A small opening is then applied to the bone domain to allow for small vessels running along the bone. Any such vessels are identified by the difference between the original filled bone domain and the opened domain. These vessel domains are combined with the vessel regions identified by filtering and thresholding as described in the preceding paragraph, to identify all of the possible vessel regions within the original automatically segmented bone domain.

Any suitable morphological operations, for example fill, open or close, may be applied to the identified potential vessel regions, if desired for a particular application.

At the end of stage 38, in both the "large vessel" and "medium to small" vessel cases, the image data processing unit 12 identifies the possible vessel regions within the original automatically segmented bone domain.

At the next stage 40, the image data processing unit 12 performs a further segmentation process to identify the missing region of the vessel. Any suitable segmentation process may be used, but in this case a level set segmentation is used to identify the missing region of the vessel. The identified potential vessel region(s) identified at stage 38 are used as a constraint in the level-set segmentation of the occluded vessel. In the present case, the constraint ensures that the missing region of the vessel passes only through the identified potential vessel region(s). The determined property or properties of the vessel, for example size of the vessel, can also be used as a constraint in the level set process or other segmentation process.

The level-set can ensure the segmented vessel is smooth (due to curvature constraints) and connected. The curvature constraints also help prevent misidentification of bone as vessel in the event of inaccuracies in the morphological constraints.

Figure 4B:
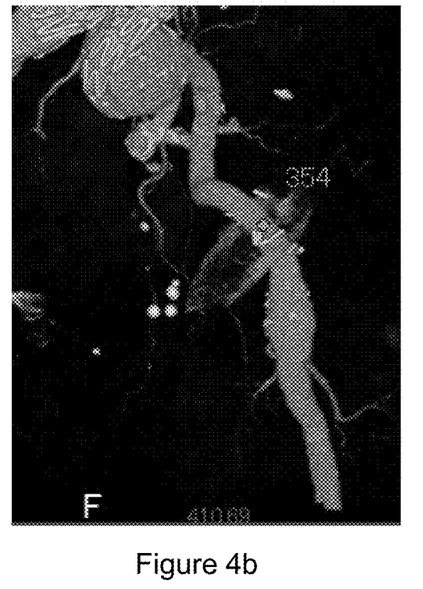
FIG. 4b is a view of the region shown in FIG. 4a, with a missing vessel region having been restored.

Finally, at stage 42, the image data processing unit 12 generates a revised representation of vessel including the previously-missing region or regions. An image of the vessel may then be displayed on the display device 4. By way of example, FIG. 4*b* provides a view of the region shown in FIG. 4*a*, with a missing vessel region having been restored.

The process described with reference to FIG. 4 may be used in respect of image data representative of any suitable area of the body.

The embodiment of FIG. 1 can provide for the restoration of missing vessels in an automated or semi-automated fashion, without requiring manual identification of the missing regions.

The embodiment of FIG. 1 has been described in relation to the processing of CT data. Any other suitable image data may be used in alternative embodiments, for example any type of CT data, for instance CT angiography data, MRI data, or PET data.

Any suitable vessels may be imaged using embodiments, for example blood vessels, airways, lymph vessels or nerve structures.

The described embodiment provides for identification and restoration of missing regions of vessels based on the selection by a user of one or more points associated with the vessel. In alternative embodiments, the selection of the one or more points may be performed automatically, for example by automatic selection of one or more points near the end of a vessel region identified during the initial segmentation.

It will be well understood by persons of ordinary skill in the art that whilst some embodiments may implement certain functionality by means of a computer program having computer-readable instructions that are executable to perform the method of the embodiments, the computer program functionality could be implemented in hardware (for example by means of a CPU or by one or more ASICs (application specific integrated circuits)), FPGAs (field programmable gate arrays) or GPUs (graphic processing units) or by a mix of hardware and software.

Whilst particular units have been described herein, in alternative embodiments, functionality of one or more of those units can be provided by a single unit, processing resource or other component, or functionality provided by a single unit can be provided by two or more units or other components in combination. Reference to a single unit encompasses multiple components, for example units, providing the functionality of that unit, whether or not such components are remote from one another, and reference to multiple units encompasses a single component, for example unit, providing the functionality of those units.

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms and modifications as would fall within the scope of the invention.

The invention claimed is:

1. An image data processing apparatus, comprising:
processing circuitry configured to
obtain segmented image data segmented from a volumetric data set using a segmentation process, wherein the segmentation process comprises applying a mask to the volumetric data set and removing data from the volumetric data set corresponding to a region of the mask to obtain the segmented image data, the segmented image data includes a representation of a vessel, and the representation of the vessel includes multiple domains separated from each other because a region of the vessel is present in the volumetric data set, but missing from the representation of the vessel included in the segmented image data,
identify at least one point at or near the boundary of the missing region,
identify the region of the vessel that is missing from the representation of the vessel within the segmented image data by performing a further segmentation process using the location of the at least one identified point at or near the boundary of the missing region, and
generate a revised representation of the vessel by restoring in the segmented image data a region of the volumetric data set that includes the missing region of the vessel.

2. The apparatus according to claim 1, wherein the processing circuitry is further configured to select at least one point associated with the vessel, and determine the at least one point at or near the boundary of the missing region using the at least one selected point as a starting point.

3. The apparatus according to claim 2, wherein the processing circuitry is further configured to select a rendered view of the segmented image data, and select the at least one point associated with the vessel based upon a user selection of at least one point in the rendered view.

4. The apparatus according to claim 1, wherein the processing circuitry is further configured to identify the at least one point at or near the boundary of the missing region using a level-set segmentation process.

5. The apparatus according to claim 1, wherein the processing circuitry is further configured to determine at least one property of the vessel, and to use the determined at least one property as a constraint in the performance of the further segmentation process.

6. The apparatus according to claim 5, wherein the processing circuitry is configured to determine the at least one property of the vessel, which comprises at least one of a size of the vessel, a cross-sectional diameter of the vessel, an orientation of the vessel, a spatial configuration of the vessel.

7. The apparatus according to claim 5, wherein the processing circuitry is further configured to determine the at least one property of the vessel using a level-set segmentation process.

8. The apparatus according to claim 1, wherein the missing region of the vessel is occluded by a mask region, and the processing circuitry is further configured to perform at least one operation to identify at least one potential vessel region within the mask region.

9. The apparatus according to claim 8, wherein the processing circuitry is further configured to perform the further segmentation process to identify the missing region of the vessel subject to a constraint that the missing region of the vessel passes through the at least one identified potential vessel region.

10. The apparatus according to claim 8, wherein the processing circuitry is further configured to select the at least one operation to identify vessel regions from a plurality of possible operations in dependence on an estimated size of the vessel.

11. The apparatus according to claim 10, wherein the processing circuitry is further configured to, if the estimated size of the vessel is above a threshold, apply a size-dependent filter to identify non-vessel region(s) in the mask region, and subtract the non-vessel region(s) from the mask region.

12. The apparatus according to claim 10, wherein the processing circuitry is further configured to, if the estimated size of the vessel is below a threshold, fill the mask region then apply a size-dependent filter to identify non-vessel region(s), and subtract the identified non-vessel region(s) from the mask region.

13. The apparatus according to claim 8, wherein the processing circuitry is further configured to fill the mask region before performing at least one operation to identify vessel regions within the mask region.

14. The apparatus according to claim 13, wherein the processing circuitry is configured to fill the mask region, the filling comprising filling a series of two-dimensional slices of the mask region.

15. The apparatus according to claim 8, wherein the processing circuitry is configured to perform the at least one operation, which comprises applying a size-dependent filter to identify regions above or below a threshold size.

16. The apparatus according to claim 15, wherein the processing circuitry is further configured to subtract filtered data resulting from the application of the size-dependent filter, and mask data representing the mask region, to identify the potential vessel region(s) within the mask region.

17. The apparatus according to claim 8, wherein the processing circuitry is further configured to perform a morphological operation to at least one of fill, open, or close the identified potential vessel regions.

18. The apparatus according to claim 1, wherein the processing circuitry is configured to obtain the segmented image data of the vessel, the vessel comprising at least one of a blood vessel, an airway, a lymph vessel, and a nerve structure.

19. An image data processing method, comprising:
obtaining segmented image data that is segmented from a volumetric image data set using a segmentation process, wherein the segmentation process comprises applying a mask to the volumetric data set and removing data from the volumetric data set corresponding to a region of the mask to obtain the segmented image data, the segmented image data includes a representation of a vessel, and the representation of the vessel includes multiple domains separated from each other because a region of the vessel is present in the volumetric data set, but missing from the representation of the vessel included in the segmented image data;
identifying at least one point at or near the boundary of the missing region;
identifying the region of the vessel that is missing from the representation of the vessel within the segmented image data by performing a further segmentation process using the location of the at least one identified point; and
generating a revised representation of the vessel by restoring in the segmented image data a region of the volumetric data set that includes the missing region of the vessel.

20. A non-transitory memory storing computer-readable instructions that are executable by a processor to perform the method according to claim 19.

* * * * *